Sept. 5, 1967      H. B. MUELLER      3,339,693
CARD CONTROLLED AUTO PARK
Filed Dec. 30, 1965      9 Sheets-Sheet 1
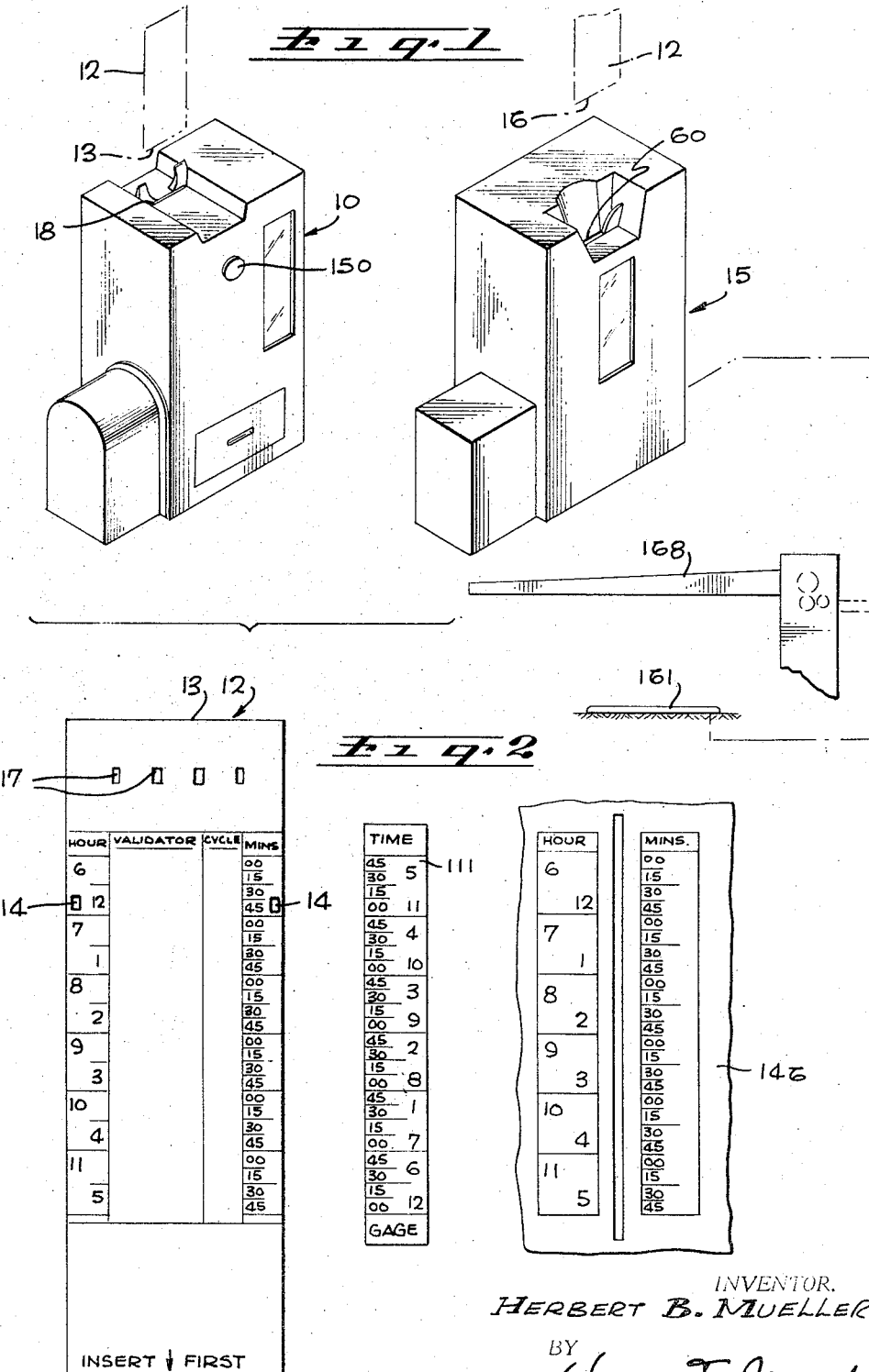

Sept. 5, 1967   H. B. MUELLER   3,339,693
CARD CONTROLLED AUTO PARK
Filed Dec. 30, 1965   9 Sheets-Sheet 2

INVENTOR.
HERBERT B. MUELLER
BY Warren T. Jessup
ATTORNEY

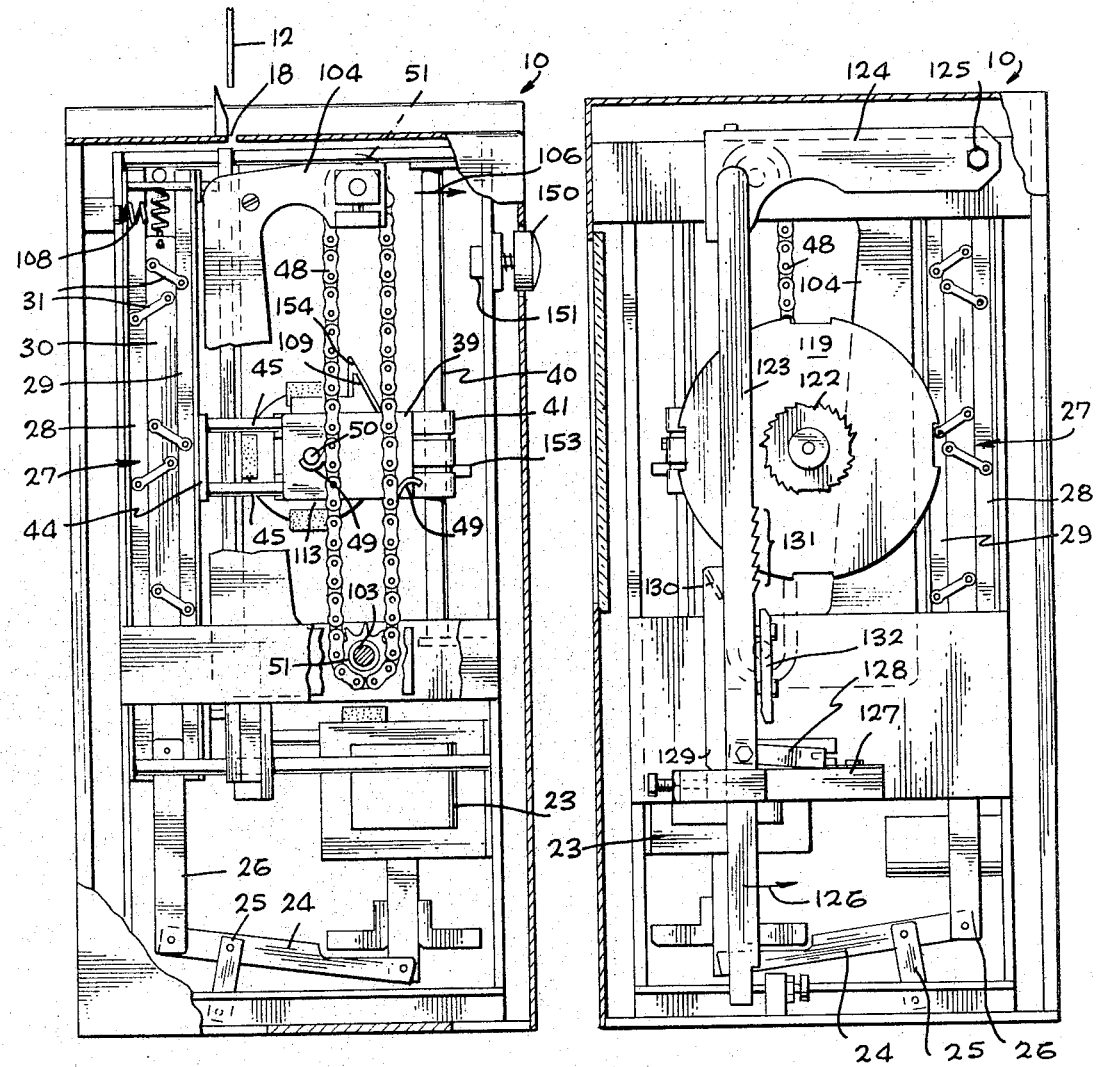

Sept. 5, 1967  H. B. MUELLER  3,339,693
CARD CONTROLLED AUTO PARK
Filed Dec. 30, 1965  9 Sheets-Sheet 4
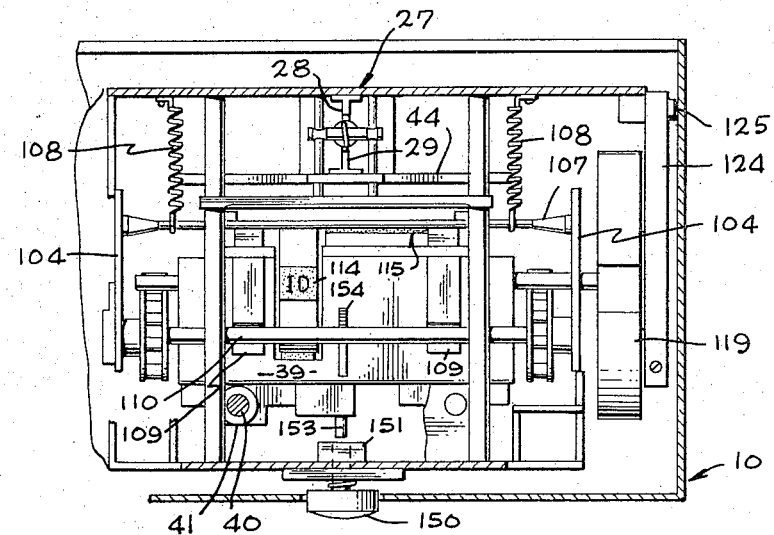
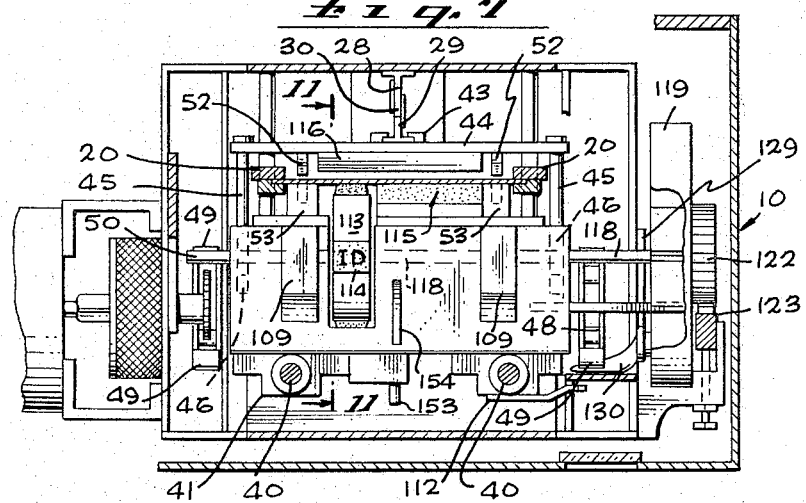
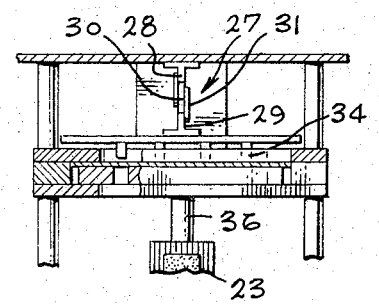
INVENTOR.
HERBERT B. MUELLER
BY
Warren T. Jessup
ATTORNEY

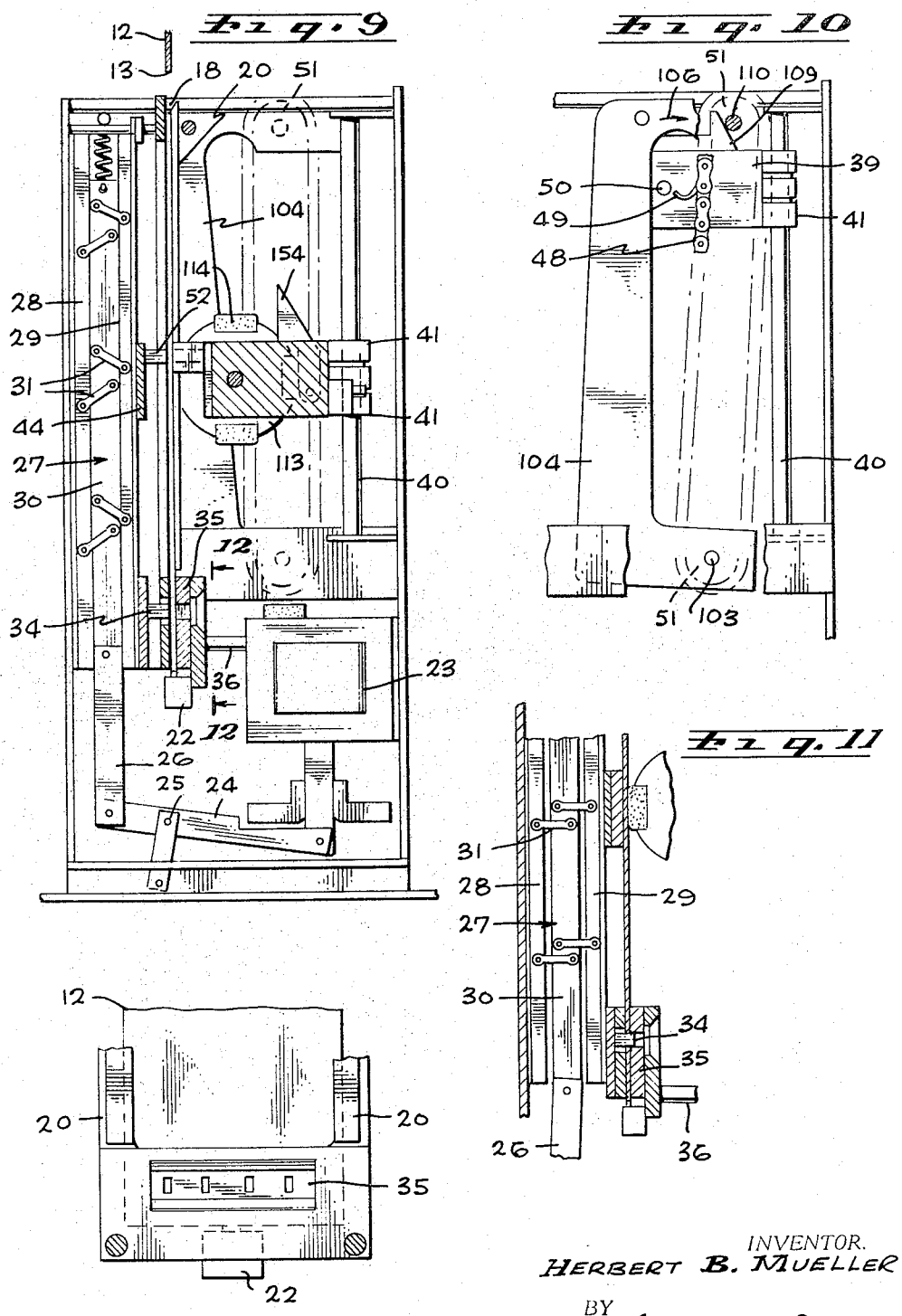

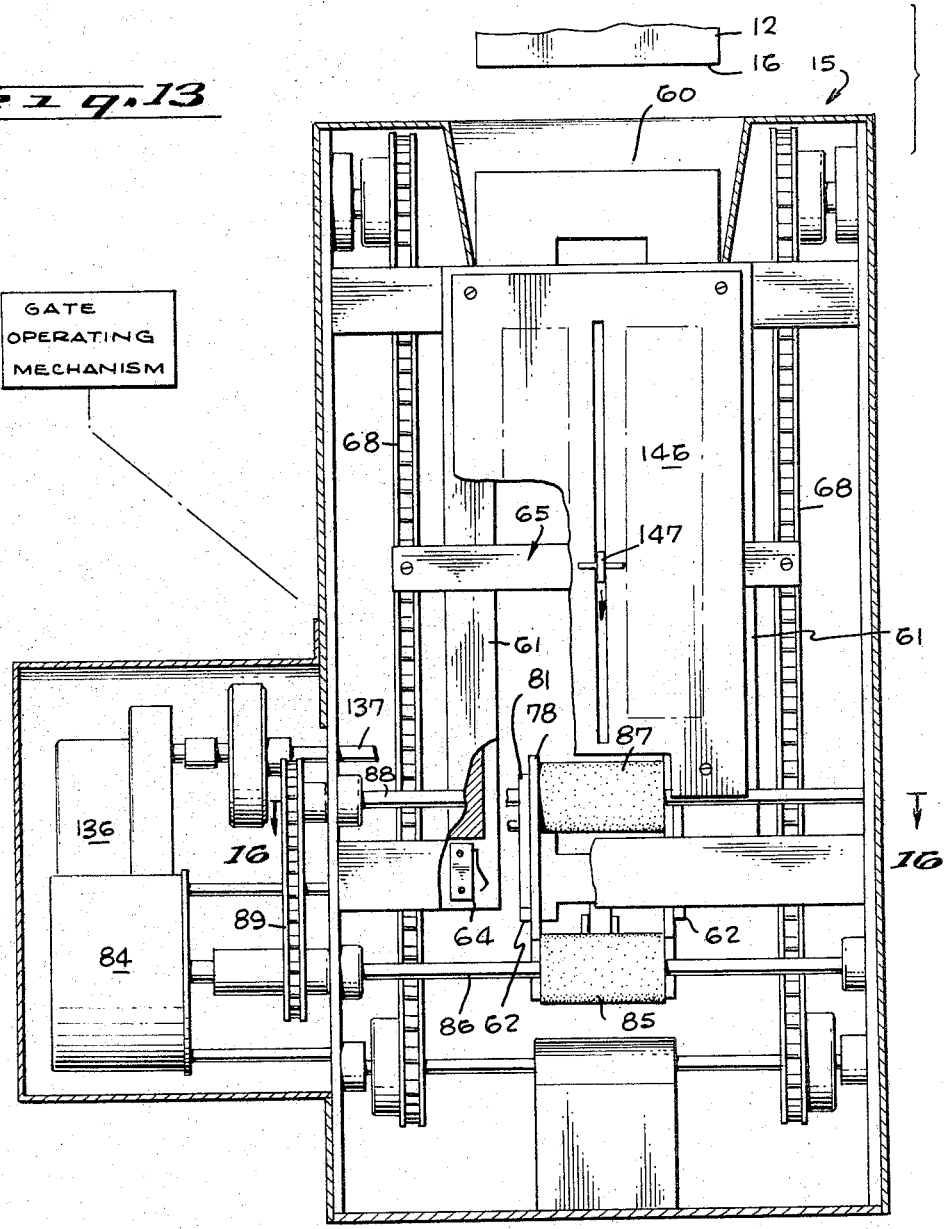
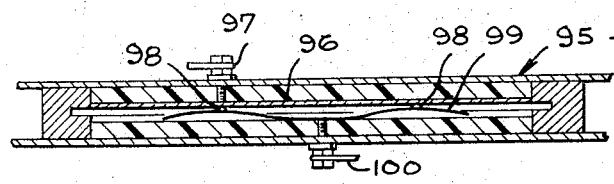

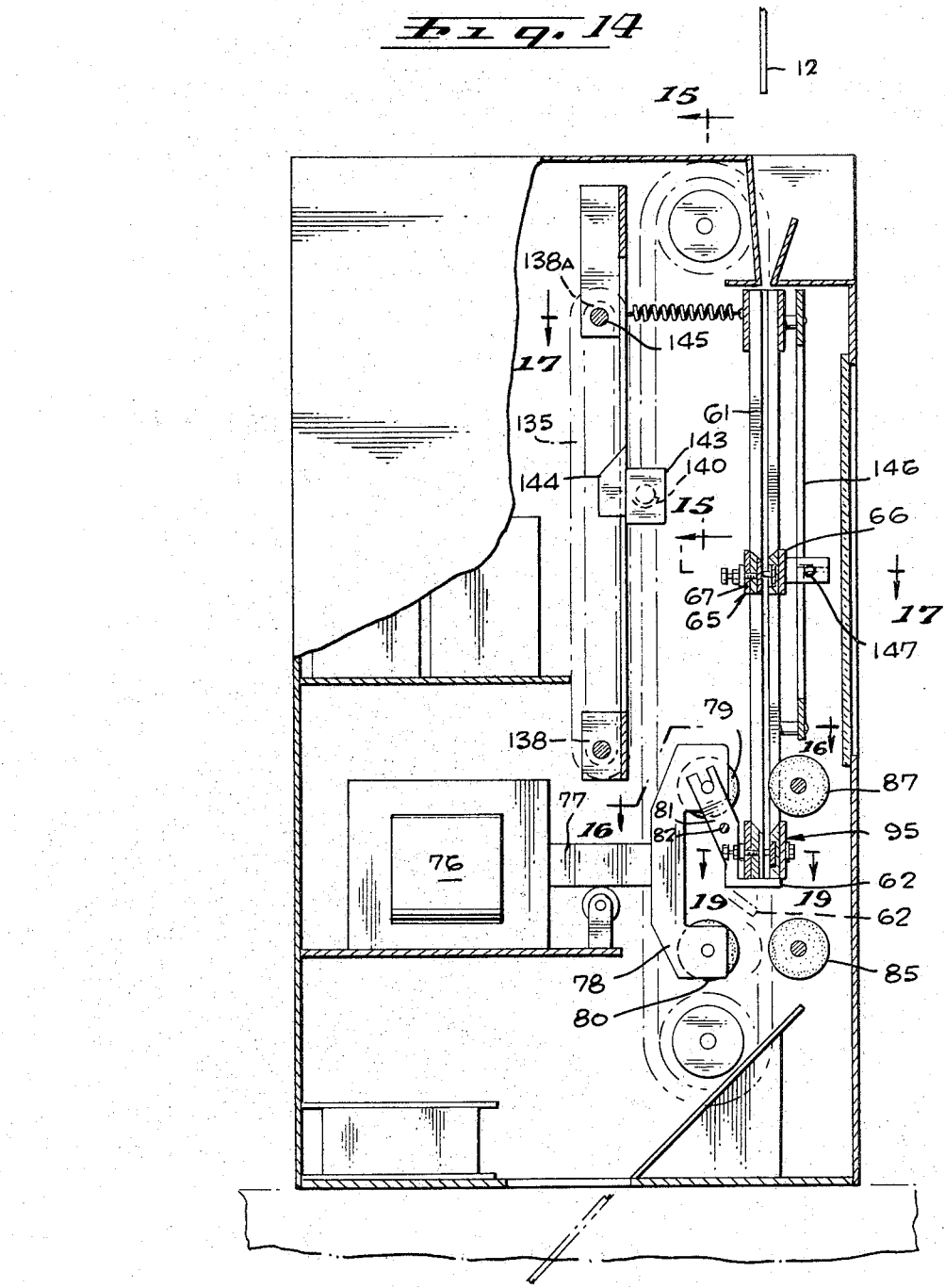

Sept. 5, 1967 H. B. MUELLER 3,339,693
CARD CONTROLLED AUTO PARK
Filed Dec. 30, 1965 9 Sheets-Sheet 8
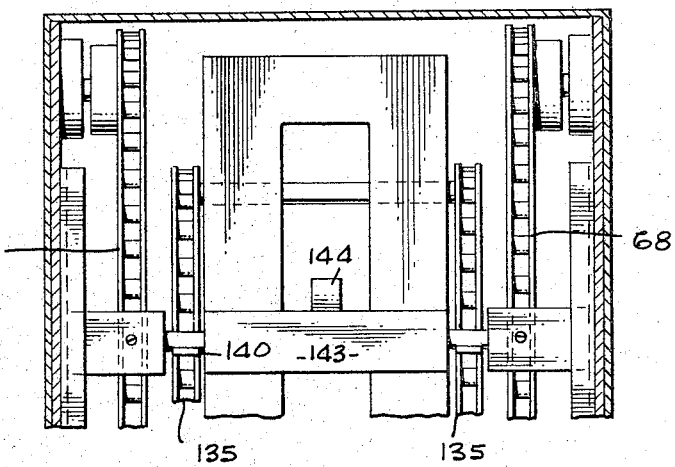
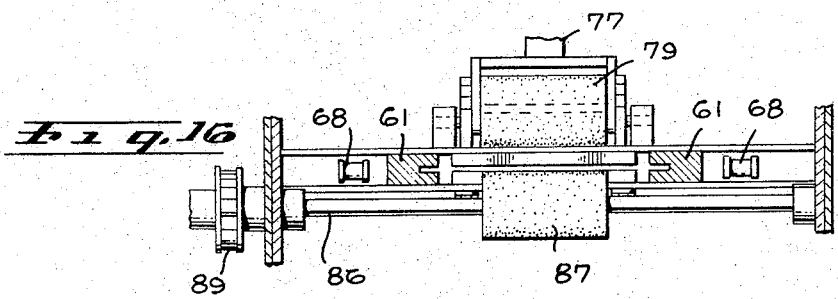
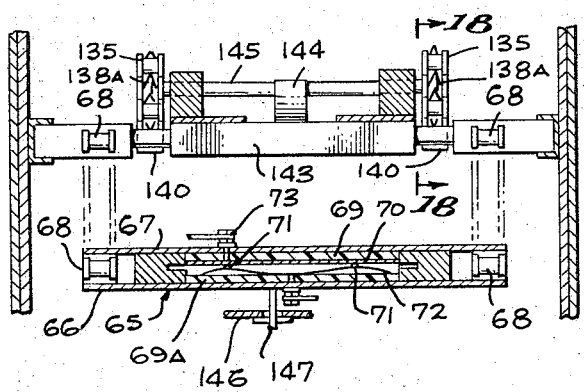
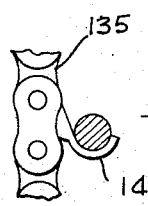
INVENTOR.
HERBERT B. MUELLER
BY Warren T. Jessup
ATTORNEY INVENTOR.
HERBERT B. MUELLER
BY Warren T. Jessup
ATTORNEY United States Patent Office 3,339,693
Patented Sept. 5, 1967

3,339,693
CARD CONTROLLED AUTO PARK
Herbert B. Mueller, 7767 Hollywood Blvd.,
Hollywood, Calif. 90040
Filed Dec. 30, 1965, Ser. No. 517,619
5 Claims. (Cl. 194—4)

This invention relates in general to parking lot control devices for unattended parking lots, and more specifically, to a system wherein a remote validator in the office of a participating member is time related to an exit gate control, through a validated key card.

Unattended parking lots are in common use, wherein a parking customer enters the lot through a one-way entrance, and then is able to exit by placing a coin in the control box of an exit gate. This type system lends itself well to issue of tokens by a participating member of the system, to operate the gate instead of using a coin.

Such system does not provide a limit on the time that such token is operable for the gate. Hence, abuse of the privilege is common. A bank patron, for example, will do some minor banking act to receive a token, and then spend long periods of time shopping in the neighborhood before returning to use the token.

This invention provides a validating device in each participating member's establishment. The validating device provides a time-related indicia on the key card by inserting the card into the device. Thereafter, this key card with its time-related indicia is inserted into a gate control to gain exit privileges. The gate control, however, is also time related and it is adapted to respond to the key card only for a limited period of time after the time of validation. In other words, the key card has a limited life of usefulness after validation.

It may be stated that an object of this invention is to provide a key card controlled device wherein an electrical circuit is completed by coded areas of said key card positionally related to the card surface as a function of time.

Another object of this invention is to provide a time-related key card validator to establish said areas, and a time-related, read-out, circuit-making system in said controlled device, wherein the read-out circuit-making system will fail to read out after a period of time predetermined by the location of the established coded areas.

A related object is to provide a system wherein several establishments provide parking in one area, and a means for distributing the charges of operation equitably among the members in relationship to the time a patron is doing business in each member establishment during one parking interval.

In accordance with these and other objects which will become apparent hereinafter, the best mode contemplated for the present invention is disclosed in the accompanying drawings wherein:

FIGURE 1 is an illustration of a validator, a key card operated control, and a parking lot gate;

Validator

FIGURE 2 is an illustration of a key card and the two time-indicating plates from the validator and gate operator in juxtaposition to show the inter-relationship thereof;

Figure 3:
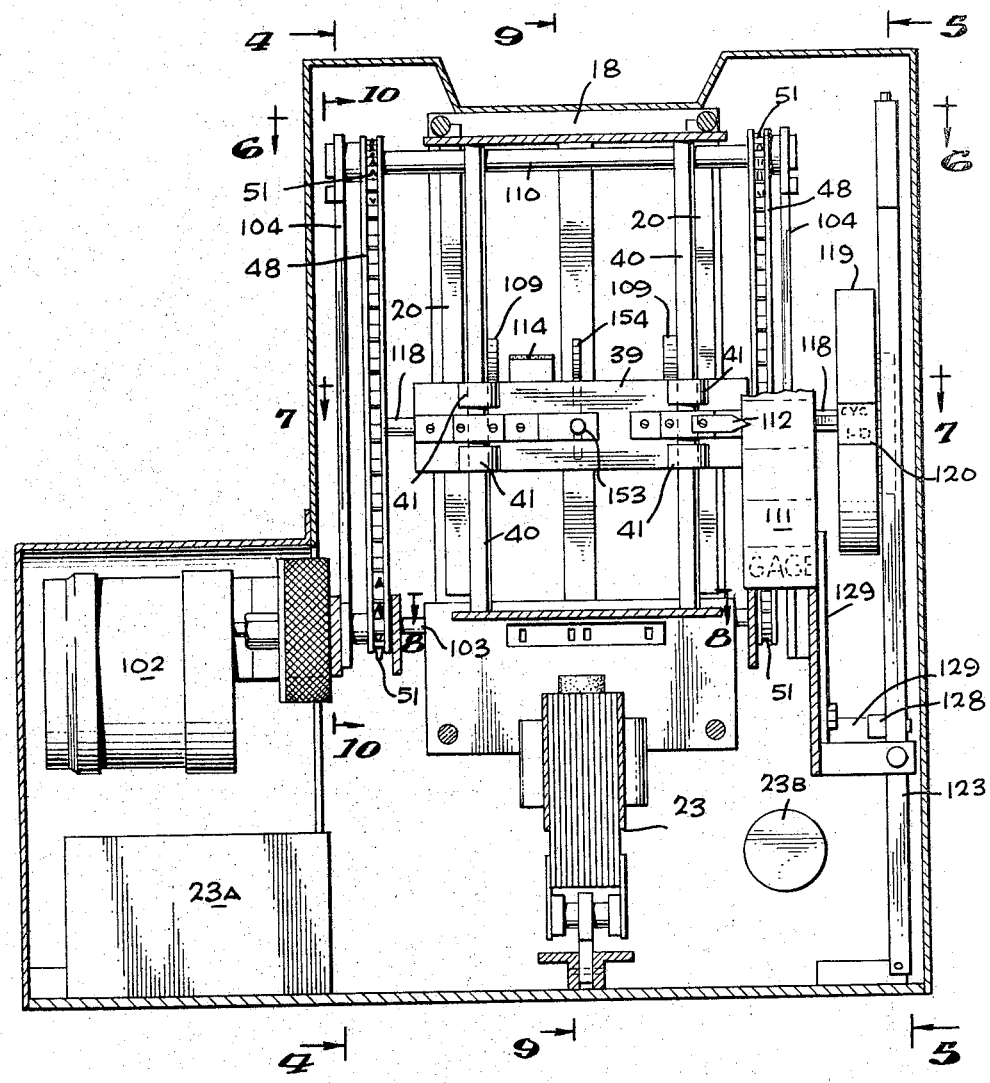
FIGURE 3 is a front elevation of the validator machine, with the front structural plate removed, to reveal the interior construction.

FIGURES 4 through 10 are section views taken along the respective lines 4 through 10 shown in FIGURE 3;

FIGURE 11 is a partial vertical section detail as viewed substantially from the plane of line 11—11 of FIGURE 7;

FIGURE 12 is a detail of a punch and microswitch as viewed along line 12—12 of FIGURE 9;

Gate control

Figure 20:
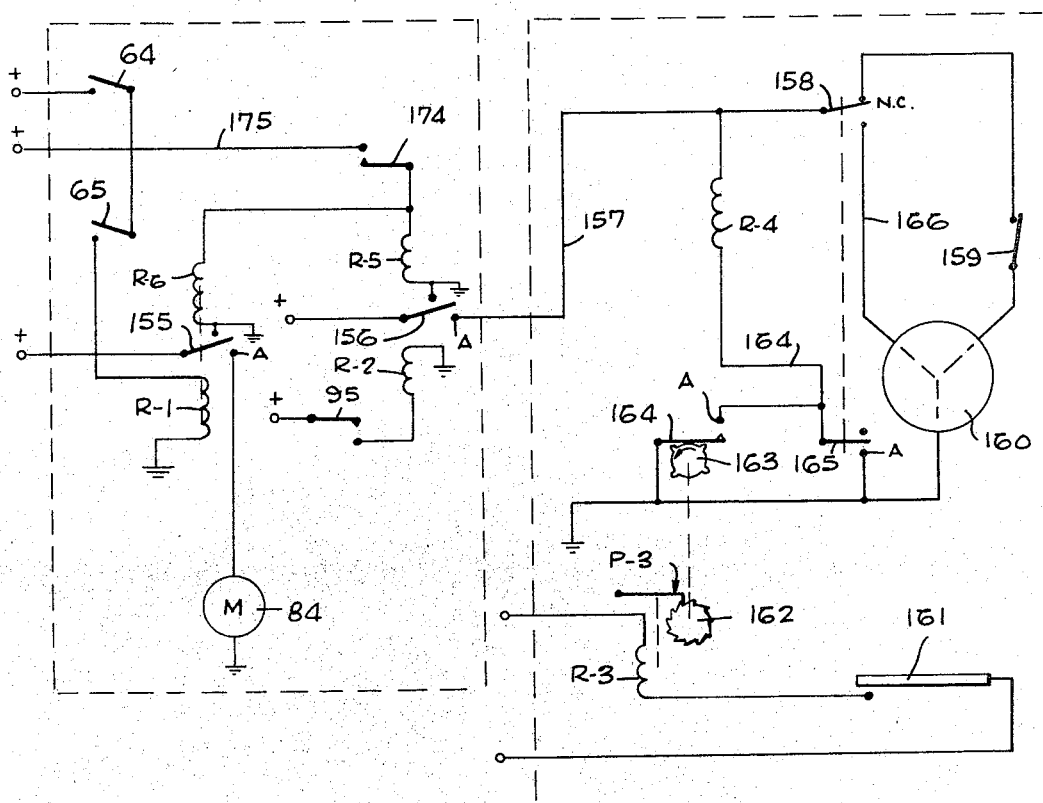

FIGURE 13 is a front elevation of the gate-operating control, with the front and top of the housing removed, and portions of the front time plate broken away to reveal interior construction;

FIGURE 14 is a side elevation of the gate-operating control with the casing broken away to reveal portions of interior construction;

FIGURE 15 is an elevational view of the upper portion of the actuating mechanism as viewed from the position of lines 15—15 of FIGURE 14;

FIGURE 16 is a detail of that portion of the control which is the key card conveyor system and part of the electrical control, as seen along the line 16—16 of FIGURES 13 and 14;

FIGURE 17 is a detail illustrating the construction of a traveling conveyor switch, and the relationship of two chain drive systems to produce a contragravity movement, as taken along the line 17—17 of FIGURE 14;

FIGURE 18 is a detail taken along the line 18—18 of FIGURE 17;

FIGURE 19, on Sheet #6, is an enlarged section through the fixed position switch, as taken essentially along line 19—19 of FIGURE 14;

FIGURE 20 is a combined electrical circuit diagram of the gate control; and

Figure 21:
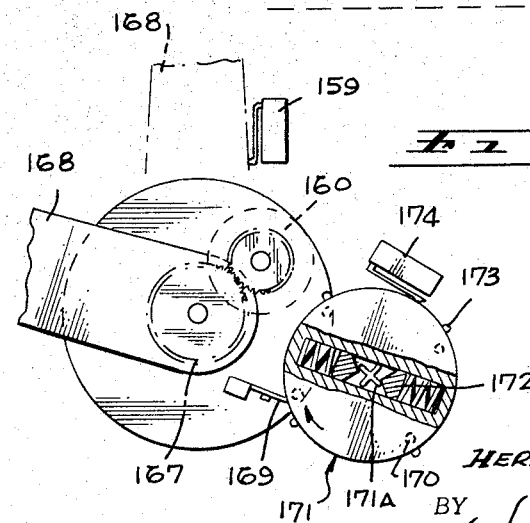

FIGURE 21 is a schematic illustration of a parking lot gate and the portion of the electric circuit controlled thereby.

For the purpose of simplifying the discussion of the illustrated preferred embodiment of the invention, the validator will be considered to be in a bank, and the gate and its operating mechanism in an adjacent parking lot. Hence, the devices are not in juxtaposition as shown in FIGURE 1. A key card is issued by a time-marking vendor as the patron drives into the lot. The key card is thereafter validated by the validator and carried to the gate control. If further shopping is desired before return to the lot, each establishment in turn will revalidate the card and the time lapse between each will indicate the financial responsibility of each establishment. The validation is done by producing coded "conductive" areas on the card. The illustrated embodiment of coded areas is the provision of through holes, and these holes allow electrical contacts to "make" through those holes. Such conductive area might literally be a printed electrically conductive material, or in any other suitable manner. For example, the holes may be employed to conduct an air stream for actuation, much in the manner of a player piano.

At the bank, a validator is placed in a convenient position where it may be used by authorized employees. A card 12, shown in FIGURE 2, is placed into the validator 10 and made conductive at a distance from one end 13. End 13 is placed into the validator 10, and extends to a stop switch mechanism. Punches activated by the stop switch mechanism are caused to punch out rectangular holes 14. For the purpose of illustration, the FIGURE 2 shows holes 14 punched to indicate a time span of 12:30 to 12:45. At the present level of discussion, this could be either a.m. or p.m., but being a bank operation, it would normally suggest p.m.

The distance from the end 13 to the holes 14 is made a direct function of time by means of a traveling punch system within the validator causing the punch to move along the time scale under the control of a clock mechanism. Hence, the marking has a true relationship with clock time, and consecutively marked cards will have the holes at progressively greater distances from the end 13.

The gate operator, indicated by the reference character 15, has an electrical circuit including a fixed position switch which is operated by contact of the end of card 12. In the preferred embodiment of the invention, a second end of the card, indicated by reference character 16, is inserted first into the gate operator.

Within the gate operator, a traveling switch moves along a receiving track provided to guide the card. The traveling switch has electrical contacts separable by the insertion of the card into the track. These contacts are made conductive by the alignment of the conductive areas of the card with the switch contact position. Hence, if the fixed switch of the gate operator is operated by contact of the card, and the traveling switch has its contacts aligned with the conductive areas punched in the card, a circuit is completed to start a conveyor. The conveyor takes the card into the machine away from control by the person using the system. Hence, if the key card 12 is used after validation within a period of time before the gate operator traveling switch moves more than an allowable distance, the conveyor of the gate operator will take the card. If too much time has elapsed, the gate operator will not accept the card.

A separately punched conductive area produced by the validator 10 is indicated by the row of punched holes 17. These holes are a key code, and one or more of the areas will actuate a gate control switch within the gate operating device, after the card has progressed through the machine to a remote position out of reach of the user. The card must have the proper code punched into the area 17, or the conveyor system will simply pass the card into the collection bin without operating the gate. Therefore, the location of the time-related openings, and the code openings, make for a system which is efficient, and yet places more difficulty into the way of a forger than the forging of such a card is worth.

VALIDATOR

A. *Making of fixed-position holes*

The FIGURES 3 through 12 are directed to the validator 10, and the balance of the figures are directed substantially to the gate operator 15.

In the use of this system, a validator 10, as shown in FIGURE 1, will be placed in the bank or other location where patrons will call. Upon entering the parking area, the patron will be issued a time-stamped validated key card. This will be validated in the validator. The validator has a guide entrance slot 18 to receive the card 12. The face of two tracks 20 may be seen in FIGURE 3, and the FIGURE 6 shows them in section. These tracks guide the cards in a vertical path into the validator.

The travel of card 12 into the validator may be best followed in FIGURE 9. The card enters the slot 18 and is guided by tracks 20 through to an end stop. In its fully-inserted position, the card will actuate a switch 22. Upon contact of the switch 22 by card 12, an electrical circuit (not illustrated) is activated to activate a relay 23A to supply power to a solenoid 23. A capacitor 23B is provided in the circuit to hold the relay and cause the solenoid to hold in its activated position momentarily. Solenoid 23 is a powerful solenoid capable of delivering drive energy. It is operative through a lever 24 and pivot 25 to pull a tie 26.

FIGURES 4, 9, and 11 show a unique drive device ladder 27. It is positioned vertically at the rear portion of the validator and is composed generally of two parallel posts, one being a fixed post 28, and the other a laterally-movable post 29. A draw bar 30 extends between the two posts 28 and 29 and is connected to the tie 26. The tie 26 serves as a pivotal tongue which draws the bar 30 downwardly upon activation of the solenoid 23.

The fixed post 28 and the movable post 29 are each secured to the draw bar 30 by pivotal links 31. When the ladder is inactive, the links 31 are pivoted in an angular direction, one end to one of the posts and the other end to the draw bar. Any convenient number of such links may be employed commensurate with strength requirements with the particular size machine.

As the draw bar 30 is pulled in a downward direction by the tie 26, the links 31 are caused to pivot from the angular to a lateral aligned position, and, hence, thus drive the movable post 29 away from the fixed post 28. Because the two posts and the draw bar are longitudinal members and the links are spaced all along the members, the movement of the post 29 is a lateral expansion of the ladder 27. Hence, any part of the movable post 29 may be employed as a drive ram to which members may be attached for a drive movement. FIGURES 9 and 11 illustrate the operation of this drive mechanism by a comparison of the inactive and actuated conditions.

Punches 34 are provided adjacent the end of tracks 20 to produce the fixed position holes 17 used for gate control. Punches 34 are carried on the face of the movable post 29, and is, therefore, driven in a lateral reciprocating path as the post 29 is activated. A die and its backup plates, indicated by the reference character 35, and seen best at the bottom portion of the apparatus in the FIGURES 9 and 11, is aligned to receive the punch 34. A rod 36 is carried by the solenoid 23 as a convenient mounting stand for die 35. The die 35 and punch 34 are fixed elevationally, and, hence, each card is punched at the same distance from the end. The location of switch 22 determines the location of the card when the power is provided to drive the punch.

The punch 34 is used to provide the conductive areas that will be used in the gate operator 15 to actually operate the gate. Other conductive areas are provided which cause the gate operator to accept the card and take it into position to align the holes made by the punch 34 with the proper responsive device.

Any number of punches 34 may be employed, and may be positioned in relative spaced relationship according to any desired key code. Hence, the forgery of the conductive areas for operating the gate is complicated by the greater number of such conductive areas and their relative spacing, if this is found to be necessary. In FIGURE 12, the die and its holder 35 is illustrated as having four openings. One or more may be used at any given time. In FIGURE 2, it will be seen that the card 12 has actually been punched with four such holes, thereby indicating that each of the holes in the die 35 has been used.

B. *Making of time-related holes*

The holes 17 are fixed in distance from end 13. Time-related holes 14 are not fixed. In order to produce the time-related holes 14, a traveling die holder 39, seen in FIGURE 3, moves vertically with respect to the position of the card in the tracks 20. The die holder 39 is guided vertically upon two posts 40 by means of guide bearings 41. Posts 40 are located near the forward part of the gate operator. Further construction details of the die holder 39 and its bearing-guided mounting may be seen in the FIGURES 3 and 4.

The die holder is supported on the side opposite the posts 40 by means of a slotted slide 43. Refer to FIGURE 7, where it will be seen that the movable post 29 of ladder 27 is a T beam configuration. The slotted slide 43 is configured to fit closely upon the face of that post 29 and serve as a slideable carriage. A crossplate 44 is secured to the slide 43 and extends laterally, substantially on a parallel relationship with the die holder 39. At opposite ends of crossplate 44, there are four slide pins 45 which bridge the gap between plate 44 and holder 39. The location of these pins may best be seen in FIGURES 4 and 7. The pins 45 are received slideably into sockets 46 of holder 39. These sockets 46 may be seen only in FIGURE 7 in dotted outline. These pins provide support for the die holder 39 on the plate 44, which is vertically shiftable on reciprocating ladder post 29.

An endless chain 48, operating in a vertical track as best seen in FIGURE 4, has a hook 49 engaged with a pin 50 on the side of the die holder 39. There are two sets of endless chains 48, one on either side of the die holder 39, and each operating around vertically-spaced sprockets 51. See FIGURE 3. The chains are driven in a clockwise path as viewed in FIGURE 4, and, hence, cause the die holder to elevate with respect to the tracks 20. The chain is driven a fixed predetermined distance in relationship to time, and the position of the die holder is related to the surface of a card in the tracks with respect to time.

Punches 52, which may be seen best in FIGURE 7, are also carried by the plate. Punches 52 operate in conjunction with dies 53, carried by die holder 39. The punches 52 and dies 53 are spaced across the card path established by the tracks 20. Because the crossplate 44 is carried on the face of the movable post 29, the punches 52 are driven laterally into the dies 53 upon activation of the solenoid 23, as shown in FIGURE 11.

As thus far described, the validator provides a track into which a card may be fed until it touches a switch at the end of its path. That switch activates means for driving two sets of punches, one of which is fixed with respect to the path and produces a coded location with respect to the end of the cards, and the other of which is constantly moving in relationship to time, and will produce a punch opening at a distance from the end of the card according to the time at which the card is placed into the apparatus. Thus, two separate sets of punched indicia are provided on the card when it is inserted into the validator 10. The card is validated by placing end 13 into the validator first in order to space the openings 14 from that end, as well as to make the machinery of the validator more workable. The operating apparatus is thus carried deep within the machine without obstructions, and a collection drawer, as shown in FIGURE 1, will catch punchings for disposal.

GATE OPERATOR

A. Conveyor operation

After the validation of card 12, the patron or client takes the card with him to the parking lot, and when he desires to drive past the gate blocking the entrance, the validated card is inserted into the gate operator 15. Note that the card 12 has the words "Insert First" and an arrow pointing in the direction of the end 16.

Upon reaching the gate operator, end 16 of the card 12 is inserted first. The patron must insert the card into the gate operator in this reverse direction for proper gate operation. The card is inserted into a slot 60 at the top of the gate operator case. FIGURES 13 and 14 show laterally-spaced individual track members 61, which guide the card down into the gate operator. The card 12 is guided by the tracks to a limit stop 62, as better seen in FIGURE 14, positioned across the end of the track. As best shown in FIGURE 13, a master switch 64 is positioned at the end of the track, and is actuated by the insertion of a full-sized card into the track. Closing of master switch 64 provides a power supply into an operating circuit which is illustrated in the FIGURE 20. Until switch 64 is closed, the control for the gate apparatus cannot be operated, regardless of the correct openings in the card 12.

A traveling switch 65, which is shown in the views 13 and 14, moves downwardly in timed relationhip with respect to distance from the limit stop 62. This movement is provided with respect to clock time and the movement is at the same rate as the movement of the die holder 39 in the validator 10.

The traveling switch 65 is illustrated in FIGURE 17 in the form of opposed plates 66 and 67 which extend laterally and embrace the sides of the two drive chains 68.

The switch 65, in the embodiment illustrated, is made up of insulator body 69, carried by the plate 67, and having a conductive copper plate 70 along the inner face a spaced distance from the metal plate 67.

A similar insulation body 69A is carried by the plate 66, and has a hollowed interior to accept a pair of spaced pins 71 carried on the face node of a sinuous leaf spring 72. The pins 71 are urged against the face plate 70. Electrical connector 73 provides a connection with the plate 70 and connector 74 with the leaf spring 72. Hence, when the pins 71 touch the plate 70, an electrical circuit is completed.

The card 12 will separate pins 71 from plate 70 to break the operating circuit, but the circuit is again re-established whenever the holes 14 coincide with the position of the pins 71 and allow them to project through the card into contact with plate 70.

In order to complete the circuit, the card must extend fully to the position of the master switch 64 in order to establish a supply of current to the circuit, and the time-related openings 14 must coincide exactly with the pins 71.

A solenoid 76, as seen best in FIGURE 14, is provided in the circuit which is completed through switch 65. A proper card inserted in the track will activate this solenoid 76. An arm 77 extends from the solenoid to a yoke 78. Two rollers 79 and 80 are spaced at opposite ends of the yoke in vertical relationship. The arm 77 is actuated in a forward direction toward the card path established by the tracks 61.

The stop 62 is carried on an arm 81 which is pivoted on a point 82. The arm 81 is bifurcated to extend over the axle of the roller 79. Hence, as the yoke 78 advances, arm 81 is caused to pivot about point 82 and move the limit stop 62 from a position across the bottom of the slot 61, to a position out of the line of the track 61, as indicated by the phantom outline of the stop in FIGURE 14.

An electric motor 84, seen in FIGURE 13, is operatively connected to a first roller 85 by means of a shaft 86. The roller 85 is positioned on the opposite side of the path of tracks 61 from the roller 80 at the bottom of the yoke. A similar roller 87 is positioned across the path of tracks 61 from the roller 79 at the top of the yoke 78. See FIGURE 14. Roller 87 is driven by a shaft 88. The shaft 86 is used as a drive shaft to drive the shaft 88 by interconnecting the two shafts through a chain 89.

The motor 84 is in the circuit which is completed through the traveling switch 65, along with the solenoid 76. Hence, whenever that circuit is completed by proper placement of the card 12, the solenoid 76 will drive the rollers 79 and 80 into contact with the rollers 85 and 87. At the same time, the stop 62 is pivoted out of the way, and the motor 84 begins turning the rollers 85 and 87. Because the rollers 79 and 87 bridge across the original position of the card in the tracks 61, the card will be conveyed down to the second set of rollers 80 and 85, and then moved on out of the bottom of the gate-operating machine. Hence, this action is a conveyor apparatus which picks up the card after it has fulfilled the qualifications of establishing a circuit, and moves the card through the gate operator machine into a storage bin. This movement takes the card completely into the gate operator and removes it from further control by the person that inserted the card.

B. Gate circuit established

The operation of activating motor 84 and the associated apparatus to take away the card simply takes the card and does not affect operation of the gate for exit. The operation of the gate for allowing exit is carried out by means of a gate-control switch 95, seen at the bottom of the track 61. Refer to FIGURES 14 and 19. The control switch is very similar in construction and operation to the traveling switch 65. It is provided with a conducting plate 96 and a current connection 97 to the plate 96.

Opposite from the plate 96 are two pins 98, in this particular illustrated embodiment, which are mounted on a spring 99 and connected into the motor control circuit by connector 100.

An electric motor 160, shown in the FIGURES 20 and 21, is operated either directly through the circuit established by means of control switch 95, or the control switch may operate a relay circuit. The relay circuit operation would usually be preferred in order that low voltage may be used exclusively within the gate actuator 15, but a high-horsepower, high-voltage motor may be employed to operate the parking lot gate.

CYCLING APPARATUS OF VALIDATOR

The operation as thus described is complete, and could be employed for a full 24-hour cycle by one continuous operation from a selected starting hour until a 24-hour period had passed. Then, by returning the traveling switch 65 and the die holder 39 to the starting position, the cycle may be repeated. However, if one movement were used for the full 24-hour cycle, then a card of extreme length must be used in order to provide any reasonable length of openings 14. The length of the openings 14 provides the time limit which is given to permit the card holder to get from the validator to the gate operation. It represents time translated to distance. The switch 65 travels at the same rate as the die holder 39, and, therefore, the length of the card traversed by either one of these devices is the manner of measuring the period for which the key card remains valid. If the key card is, for example, eight inches long, then the segment of such card which could represent one-quarter hour in twenty-four hours of full card length is relatively small, and a great margin of error exists.

Accordingly, in the preferred embodiment of the invention as illustrated, the full card length is employed for only six hours, and the validator and gate operator are recycled four times in every twenty-four hours.

In FIGURE 3, a drive motor 102 operates through a clutch to drive a shaft 103, which extends across the validator and drives the two lower sprockets 51.

Two laterally-spaced boom arms 104, seen in FIGURE 3, but better shown in FIGURES 4 and 10, are pivoted on the shaft 103 and extend up and over the position of the lower sprocket 51 to support the upper sprocket 51. The top sprocket 51 may rock from the position shown in FIGURE 4, in the direction of the arrow 106. A spanner shaft 107, best seen in FIGURES 3 and 6, holds the tops of the two boom arms 104 properly spaced, and working in unison. The shaft 107 abuts the face of the guide tracks 20 as a first limit of movement, and holds the boom arm substantially in the position shown in FIGURE 4. A spring 108 helps to hold the boom arms in the FIGURE 4 position.

As the carriage 39 is driven upwardly by the hook 49 on chain 48, a pair of cams 109, carried on the top of the die holder 39, engage a shaft 110 which serves as a common shaft for the two sprockets 51. The lateral force produced upon the shaft 110 will cause the boom arms 104 to pivot in the direction of arrow 106, because the die holder 39 is fixed against lateral movement, whereas the boom arms are free to pivot. The forward pivot movement will carry the hook 49 with the chain 48 and cause the hook 49 to withdraw from the pin 50. See FIGURE 10. The disengagement will thus allow the die holder 39 to drop by gravity down to the bottom of the guide posts 40.

The second hook 49, shown in an inverted position in FIGURE 4, will have progressed to a position wherein it will engage the pins 50 when the die holder drops to the bottom position, and the upward progress of die holder 39 will begin immediately with substantially no time lag. Hence, the die holder 39 will cycle to the top and drop back to the starting position as often in a 24-hour period as the speed of the chain 48 dictates. Hence, the motor 102 is provided with exact timing characteristics as used in clock drive mechanisms and the sprockets 51 are exactly proportioned to cause the die holder to cycle four times in each 24-hour period.

A gauge 111, shown in FIGURE 3, is provided on the face of the validator 10, and a pointer 112 is carried by the die holder 39 to allow visual inspection of the time position of the die holder. Thus, the pointer 112 serves as a visual clock as well as an indicator of position, except for the fact that the gauge can indicate two 6-hour periods, and which six hours of the twenty-four hours is left to other means of identification.

PRINTED INDICIA BY VALIDATOR

As shown best in FIGURE 7, the die holder 39 also carries a stamp wheel 113 which carries four individual rubber stamps 114, capable of marking indicia on the surface of the card 12. The four individual stamps 114 are marked to indicate four portions of a 24-hour day. In the particular example, they are marked 1D, 2D, 1N and 2N, respectively, indicating the first and second-day cycles, and the first and second-night cycles. By this means, the stamp on the surface of the validated card will indicate to the reader that the particular time to be read from the surface of the card relates to that particular segment of the day. The indicia does not in any way affect the operation of the apparatus, or control the privilege of leaving the parking lot, but it does enable the responsible parties to read the collected validated tickets and to determine whether they are being used at the wrong cycle of the day. This will aid in detecting a planned practice of gross misuse. Note that if a properly validated card is employed in the wrong cycle of the day, it will have to be used in periods of time six hours apart.

In addition to the stamp which indicates the cycle portion of the day in which the card is issued, a proprietory stamp 115 is carried on the face of the die holder 39 and this stamp will place an indicia upon the card indicating what proprietory member issued the card. This information is useful in observing the habits of a particular patron in the future in the event of alteration of the card or other mis-use. It, like the individual stamps 114, does not control the operation of the gate mechanism, but only provides useful information for apprehending those who alter the issued tickets.

A pad 116, located on the surface of crossbar 44, is driven along with the punches 52 by the forward movement of the crossplate 44. Pad 116 presses card 12 to the stamps.

A shaft 118 is carried by the die holder 39 as a drive shaft for the stamp wheel 113. The shaft 118 extends to the side of the validator 10, where a drive and indicator wheel 119 is mounted. The stamp wheel 113 and the drive and indicator wheel 119 correspond in that the stamp wheel carries the actual individual stamps, and the wheel 119 carries indicia 120 (see FIGURE 3) which provides visual evidence of what is going to be printed by the individual stamps on the card inserted into the validator.

The wheel 119 also carries a unique ratchet tooth series indicated by the reference character 122, and seen best in FIGURE 5 of the drawings. This series of ratchet teeth is in four separate series corresponding to the four cycle positions.

A rack bar 123 extends in a vertical direction adjacent the series of ratchet teeth 122 and the FIGURE 7 reveals that this rack bar is close to the surface of the indicator wheel 119 and in the plane of teeth 122. The bar 123 has a top arm 124, as best seen in FIGURE 5, which extends to a pivot mounting 125. Thus, the rack bar 123 tends to swing in the direction of the arrow 126, shown near the bottom of the bar 123. A stop abutment 127 is provided to limit the forward movement, and a pawl 128 is carried by the end of the bar as a stop to contact the abutment. The stop pawl may be pivoted out of the way to allow limited swing of the bar 123. A trip lever 129, as shown best in FIGURES 3 and 7 is employed to remove the pawl 128 from the stop abutment 127. Trip lever 129 has a cam follower arm 130 which extends into a position adjacent the chain 48, and thus will be struck by a descending hook 49. When lever 129 is actuated, pawl 128 will release and allow the bar to swing toward the stop abutment 127.

As the die holder 39 ascends to the top of its path in any one cycle, and the cams 109 cause the chain to move laterally and drop the die holder back to its bottom starting position, the wheel 119 with the ratchet teeth 122 will also drop. The rack bar has a short section of teeth 131, located below the top position of the upward movement of die holder 39. Thus, as the die holder 39 descends by free fall, if the rack teeth are positioned to engage one of the set of ratchet teeth 122, the wheel 119 will be rotated 90° by the force built up due to the free fall of the mass which includes the die holder and wheel. Thus, the stamp wheel 113 is caused to index one-quarter turn and present the next stamp in the series to the card being stamped by the validator.

The bar 123 serves the function of a drive track, but if allowed to swing free without being held by the pawl 128, the upward movement of the die holder will cause the teeth 122 to drag past the rack teeth 131 and produce a disturbing click as each tooth 122 moves past a tooth of section 131, which will be annoying in a quiet office.

A bumper 132 is carried below the position of rack teeth 131 and after the ratchet teeth 122 have passed the rack teeth 131, they will strike the bumper 132 and pivot the rack bar 123 to the left in the opposite direction from arrow 126. Then the pawl will drop behind the stop abutment and lock the rack bar in the position to which it has thus been driven, and this position is out of alignment with the two sets of teeth and hence no noise will be heard as the die holder ascends.

The hook 49, however, will strike the cam follower arm 130 sometime prior to the die holder reaching its top position in order to release the pawl 128 and allow the rack bar 123 to swing again into alignment for such engagement. In FIGURE 5, the bar 123 is in the storage position for inaction, and the stop must be released before the rotary action will take place.

CYCLING APPARATUS OF GATE OPERATOR

The gate operator 15 is operated on somewhat the same drive principles as the validator 10, but the traveling switch 65 moves in the opposite direction with respect to the card stop 62, as the die holder 39 moves with respect to the card stop in the validator. The holes 14 are punched as a rectangular slot in order that there will be some degree of time in which the card will be valid after it is given to the patron or client.

To drive the switch 65 downwardly in the gate operator 15, a pair of drive chains 135 act as the driver to operate the chain 68. See FIGURES 14 and 17. Drive chains 135 are powered by a clock motor 136, seen in FIGURE 13, operating through a shaft 137, which drives a lateral pair of sprockets 138. The shaft 137 is broken and chain 135 is removed in FIGURE 13 for illustration and clarity, but are seen in FIGURES 14 and 17. Both chains are extended over top sprockets 138A.

The chains 135 have a series of hooks 140 similar in spacing and form to those hooks 49 described with respect to chain 48.

A crossbar 143, which serves also as a weight, spans the two chains 68 and serves as a connector to which the hooks 140 may engage to drive the chains 68 in the direction of the arrow and cause the traveling switch 65 to move downwardly in a time-related advance.

The crossbar 143 has a cam 144 positioned to engage the axle 145 spanning between the top sprockets 138, and to pivot the drive chains 135 away from the crossbar and thus cause the hooks 140 to disengage the crossbar. The crossbar is heavy and acts as a weight to return the chain system 68 in the direction opposite the arrow and cause the traveling switch 65 to move again to the top position and begin a new advance toward the bottom.

A gauge plate 146 on the face of the gate operator corresponds in marking to the gauge 111 on the validator, and accordingly the two devices may be read visually and will indicate the time of day as well as the relative relationship of the two devices.

A pointer 147 is carried by the traveling switch 65 to give the visual read-out.

Whenever the apparatus of the validator and the gate operator are about to the end of one cycle and ready to change to another, it is necessary for the person issuing the validated key card to make certain that the card will actually be valid for a period sufficient to allow the patron to reach the parking gate control. If the card is inserted into the validator within the last fifteen minutes on the scale, the gate operator may operate to lift the traveling switch before the patron gets there. Thus, the gate operator would refuse to accept the key card and cause unnecessary difficulty and embarrassment.

To avoid this situation, the person operating the validator should insert a card and make the perforated holes 14 near the end of the scale, and then cause the validator to advance to the starting position for the next cycle. This gives that particular person somewhat more than a fifteen-minute period of time, but this error in overallowance is superior to permitting the embarrassing situation.

To enable the advancement of the validator, a button 150 on the face of the validator 10 is provided to operate a shaft or stem 151 of the button reaching into the interior. See FIGURES 4 and 6 for an illustration of these parts. The button is spring loaded to hold it out of the cabinet until pressed by the operator.

A shaft 153 is carried by the die holder 39 on the forward side thereof and will become aligned with shaft 151 during the last moments of the advance to the end of the scale. The shaft 153 is internally connected within the die holder to pivot a tapered lever 154 which is shown best in FIGURE 9, but also seen in FIGURE 4 behind the permanent cams 109, and seen in top plan in FIGURE 7.

The operator will apply force to the shaft 153 by pressing the button when the parts are properly aligned, and cause the tapered lever 154 to rotate and press against the shaft 110, just as the permanent cams 109 would do, and thus release the die holder 39 from the hooks 49 and permit the die holder to drop to the bottom of the scale. Then the card is reinserted to punch two more holes 14 at the opposite end of the scale. Thus, if the gate operator advances before the patron arrives, the card is still effective and useful.

FIGURE 20 is a wiring diagram, and FIGURE 21 is a schematic illustration of a parking lot gate, illustrating one type of use to which an output impulse, created by the proper alignment of coded areas 17 with switch 95, may be used.

When the proper key card 12 is placed in the track 61 of the gate operator, switch 64 is closed to provide available power from a source, as indicated by the power source symbol in the drawing.

If the card has a proper time-related code area 14 to match the position of traveling switch 65, which is the second switch in the series in FIGURE 20, then switch 65 is closed, and power from the source through the switch 64 is passed by the switch 65 to operate relay R–1.

The relay R–1 closes switch 155 and locks a mechanical holding device of the relay to hold the switch 155 closed against contact A. Thus, power from source is passed through switch 155 to motor 84 (see FIGURE 13), and the conveyor of the gate control begins to operate and pull the card through the track 61.

If the card has properly positioned and coded key code areas 17, they will allow contacts of switch 95 at the bottom of track 61 to close momentarily and supply power from source to relay R–2. Relay R–2 will close a switch 156 against its contact A. Relay R–2 has a mechanical holding device to hold switch 156 closed against contact A. Power from source, therefore, is available through switch 156 and line 157 to a switch 158, which is normally closed. The power from switch 158 is supplied to normally-closed switch 159, and to the windings of motor 160 which operates to open gate 168 of a parking lot exit.

Although the motor 160 is shown directly powered through the circuit thus described, it is feasible, and may be preferable, to interpose a relay system between switch 159 and motor 160 in order that low-voltage power may operate all the circuitry thus described, and bring in high-voltage power to the motor 160.

In FIGURE 21, a very schematic illustration of a gate and power system is shown. The gate is of a common type well known and is not further illustrated in this drawing.

As motor 160 operates through a reduction gear drive to a gear 167 carried by gate arm 168, the arm is raised to the dotted outline position shown extending substantially vertically in FIGURE 21. When the arm 168 reaches this position, it makes contact with switch 159. Switch 159 is the switch immediately preceding motor 160. Contact of switch 159 opens this normally-closed switch and brings the motor operation to a stop. The gate will stand in a vertical direction until reactivated.

Closing of the gate may be accomplished by a timer, electric eye, or other means. As one illustration, a road switch 161 is shown in FIGURE 20. A road switch is placed across the pavement adjacent the gate, on the exit side. Hence, after the gate is raised and a vehicle begins to exit, it will operate the switch 161. Because the normal usage of parking lot gates is with four-wheel vehicles, the switch 161 will be operated twice by the exit of one vehicle. Hence, it is possible to require two actuations of the switch in order to prevent the gate lowering on a vehicle that stops after passing only part way beyond the gate.

A complete circuit from a source of power to ground is shown to include a relay R–3, with the switch 161. Hence, each time the switch 161 is actuated, the relay R–3 will be actuated. Relay R–3 operates a ratchet pawl P–3, which, in turn, actuates a ratchet wheel 162. The ratchet wheel 162 drives actuator wheel 163, which has spaced cam members on the surface thereof.

The cam members are positioned such that a switch 164 is caused to close against its contact A momentarily as one of the cams is caused to swing from the position illustrated in FIGURE 20 to the next indexed similar position. The drive from 162 to 163 requires two actions by pawl P–3 in making a full rotation. This momentary contact is sufficient to supply power to relay R–4 and actuate a switch gang, including the switch 158 and a switch 165, from the normally-closed position for switch 158 and normally-open position of switch 165 to the opposite condition for both. Switch 165 is a holding contact to keep the relay R–4 in operation, after switch 164 has brought about the initial activation. As long as power is supplied through line 157, the relay R–4 will maintain this alternate condition of switch 158. In the alternate position of switch 158, power is supplied from line 157 through line 166 to cause the motor 160 to reverse and lower gate 168.

Referring to FIGURE 21, the gate 168 is shown in its downwardly direction of movement, and as it moves downwardly, a pawl 169 is caused to contact one of four cross-pins 170 in a rotary overcenter device 171. Device 171 has a hub 171–A provided with spaced recesses to receive oppositely-positioned, spring-actuated detents 172. Hence, by forcing the device 171 against the urge of the detents 172, the device may be caused to rotate until the detents enter the next adjacent recess, whereupon the spring power will cause the device to leave the pawl 169 and proceed at a rapid rate beyond the drive position which was formerly provided.

The surface of the device 171 is equipped with four surface cams 173, which are normally positioned one on either side of switch 174. Thus, as the device 171 is caused to snap over center, switch 174 is actuated momentarily by one of the surface cams 173 as it passes by.

In FIGURE 20, the switch 174 is seen to be in a power line 175, leading from a source of power to relays R–5 and R–6. Relays R–5 and R–6 are provided to overcome the mechanical holding action of the devices holding switches 155 and 156 and pull them away from contacts A to open the circuits to the motor 84 and 160. Thus, power is dropped off line 157 and relay R–4 will release the switch 158 to return to its normally-closed condition, ready to begin the cycle anew.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. A key card control system, comprising:
   a key card having first and second end edges;
   a validator means for receiving said card first end first and producing two key coded areas on said card in spaced relationship to said first end edge;
   (a) one key coded area being a fixed distance from said first edge, and
   (b) the other key coded area being at a distance from said first edge which is a function of time;
   control means for accepting said key card second end first and using the form thereof to control an output circuit, said control means including a limit stop engageable with said second end edge, a stationary switch means located a fixed distance from said limit stop for establishing a circuit in conjunction with said coded area (a), and a traveling switch means located from said limit stop a distance which is a function of time for establishing a circuit in conjunction with said coded area (b); and
   electrical circuit means including said switches as control members.

2. In a control system as defined in claim 1, said validator further characterized by:
   (1) a guide track for receiving and guiding said card first end first, and a second limit stop engageable with said first card end edge for locating said card in a validating position;
   (2) switch means for responding to said card when said card is fully extended into said track to said validation position;
   (3) a fixed position code system spaced a fixed distance from said second limit stop for providing key coded area (a), said code system activated by response of said switch means (2); and
   (4) a traveling code system, a time-related drive means adapted to move said traveling code system along said guide track relative to said second limit stop for providing key coded area (b), said traveling actuated by response of said switch means (2).

3. A key card control system, comprising:
   a validator machine having a guide track for receiving and guiding a key card of predetermined size, said track having a stop and switch means for establishing a precise card validation station and establishing a power supply only upon occupation of said station by a card;

a first key coding means a fixed distance from the said stop and switch means, producing a first key code on a card placed in said track;

a second key coding means, carriage means moving said track and said second key coding means relative to one another as a function of clock time for producing a second key code spaced from said first key code;

a power drive means operable by said established power supply for operating said first and second key coding means;

a control machine having a track, a stop, and switch means as defined in said validator machine, and being further characterized by second key code switch means activated by registration of said second key code therewith, carriage means moving said track and second switch means relative to one another as a function of clock time for driving said second key code switch means along said track, the rate of travel of said second key code carriage and second key code switch carriage being equal;

a conveyor means closeable upon said track area for grasping a card positioned in said track and conveying said card to storage;

a conveyor drive motor, and a first power circuit including said second key code switch means for operating said conveyor motor;

a second power circuit for providing a control signal to an external operation, said circuit including a first key code switch means activated by registration therewith of said first key code means, said first key code switch means being located a distance along said control machine card track for actuation by said card only as it is conveyed from its original inserted position.

4. In the control system as defined in claim 3:

the provision of a rectangular card as a part of said system;

said card having a first end insertable into said validator machine as a leading end, and a second end insertable into said control machine; and said carriage means of the validator and control moving in opposite directions with respect to the card receiving tracks, with said control machine carriage moving away from its stop.

5. A key card control system, comprising:

a key card having two space starting position stations;

a validator means for producing two key coded areas on said code cards in space relationship to a first of said starting position stations;

(a) one key coded area being a fixed distance, and (b) the other key coded area being at a distance which is a function of time;

said validator means, including a guide track for receiving and guiding said cards, switch means for responding to said card when such card is fully extended into said track to a validating position, a fixed position code system for providing key coded area (a) and activated by response of said switch means, a traveling code system for providing key coded area (b), guide means mounting said traveling code system for movement between a first station and a second station along said track, first and second spaced sprockets, one located adjacent each latter station, endless belt means looped around said sprockets, a clock motor drive means for driving the belt means, self-engaging latch means on said belt means for engaging the traveling code system at said latter first station and transporting said traveling code system to said later second station, and means at said second station to release the traveling code system from said belt means for gravity return to said first station;

control means for accepting said key card and using the form thereof to control an output circuit, said control means including a stationary switch means located a fixed distance from a first of said starting position stations for establishing a circuit in conjunction with said coded area (a), and a traveling switch means located from said starting position station a distance which is a function of time for establishing a circuit in conjunction with said coded area (b); and electrical circuit means including said switches as control members.

References Cited

UNITED STATES PATENTS

| | | | |
|---|---|---|---|
| 2,551,933 | 5/1951 | Findlay | 346—82 X |
| 2,659,470 | 11/1953 | Du Pont | 194—4 |
| 2,783,865 | 3/1957 | Cleave | 194—4 |
| 2,906,505 | 9/1959 | Orr et al. | 194—4 |

SAMUEL F. COLEMAN, *Primary Examiner.*